US012626678B2

(12) United States Patent
Yamamoto et al.

(10) Patent No.: US 12,626,678 B2
(45) Date of Patent: May 12, 2026

(54) SIGNAL GENERATION DEVICE, SIGNAL GENERATION METHOD AND NON-TRANSITORY COMPUTER-READABLE STORAGE MEDIUM

(71) Applicant: YAMAHA CORPORATION, Hamamatsu (JP)

(72) Inventors: Shin Yamamoto, Hamamatsu (JP); Takahiro Mizuguchi, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 926 days.

(21) Appl. No.: 17/898,577

(22) Filed: Aug. 30, 2022

(65) Prior Publication Data

US 2023/0068966 A1 Mar. 2, 2023

(30) Foreign Application Priority Data

Sep. 1, 2021 (JP) ................................ 2021-142676

(51) Int. Cl.
*G10H 1/02* (2006.01)

(52) U.S. Cl.
CPC ......... *G10H 1/02* (2013.01); *G10H 2210/385* (2013.01)

(58) Field of Classification Search
CPC ........................... G10H 1/02; G10H 2210/385
(Continued)

(56) References Cited

U.S. PATENT DOCUMENTS 3,590,130 A * 6/1971 Peli ........................ G10H 1/057 984/322
5,434,348 A * 7/1995 Matsuda ................ G10H 1/057 84/626
(Continued)

FOREIGN PATENT DOCUMENTS

CN 111095395 A * 5/2020 ............. G10H 1/053
CN 111095395 B * 7/2023 ........... G10H 1/0575
(Continued)

OTHER PUBLICATIONS

Office Action issued in Chinese Appln. No. 202211067493.1 mailed Apr. 18, 2025.
(Continued)

*Primary Examiner* — Christina M Schreiber
(74) *Attorney, Agent, or Firm* — ROSSI, KIMMS & McDOWELL LLP

(57) ABSTRACT

A signal generation device includes a memory configured to store instructions and a processor communicatively connected to the memory. The processor is configured to execute the instructions to function as a signal generation unit to generate a sound signal based on key operation data associated with a key operation and a decay control unit to control a decay speed of the sound signal based on pedal operation data. The decay control unit is configured to control the decay speed to a first speed in a case where the pedal operation position is in a first range, and the decay control unit is configured to control the decay speed to a second speed in a case where the pedal operation position is in a second range. A first boundary position between the first and the second ranges is determined based on control information obtained by the key operation.

19 Claims, 8 Drawing Sheets

(58) Field of Classification Search
USPC .......................................................... 84/600
See application file for complete search history.

(56) References Cited

U.S. PATENT DOCUMENTS

| | | | | | |
|---|---|---|---|---|---|
| 5,569,870 | A * | 10/1996 | Hirano | G10H 1/0575 84/622 |
| 2001/0027714 | A1 * | 10/2001 | Kondo | G10H 1/057 84/615 |
| 2014/0305286 | A1 * | 10/2014 | Fujiwara | G10C 3/12 84/603 |
| 2020/0193949 | A1 * | 6/2020 | Tanoue | G10H 1/46 |
| 2021/0201869 | A1 * | 7/2021 | Oba | G10H 1/346 |
| 2023/0068966 | A1 * | 3/2023 | Yamamoto | G10H 1/02 |

FOREIGN PATENT DOCUMENTS

| | | | | |
|---|---|---|---|---|
| JP | 2010026417 | A * | 2/2010 | G10H 1/348 |
| JP | 2011075930 | A * | 4/2011 | |
| WO | 2019058457 | A1 | 3/2019 | |

OTHER PUBLICATIONS

Office Action issued in Chinese Appln. No. 202211067493.1 dated Aug. 12, 2025.
Extended European Search Report issued in European Appln. No. 22192572.0 mailed Jan. 25, 2023.

* cited by examiner

SIGNAL GENERATION DEVICE, SIGNAL GENERATION METHOD AND NON-TRANSITORY COMPUTER-READABLE STORAGE MEDIUM

CROSS-REFERENCE TO RELATED APPLICATIONS

This application claims the benefit of priority to Japanese Patent Application No. 2021-142676, filed on Sep. 1, 2021, the entire contents of which are incorporated herein by reference.

FIELD

The present disclosure relates to a technique for generating a sound signal.

BACKGROUND

In order to make a sound from an electronic piano as close as possible to a sound of an acoustic piano, various efforts have been made. For example, in order to better reflect an effect of a damper on a sound of an acoustic piano, WO 2019/058457 discloses a technique for controlling the decay speed of a sound when a damper pedal is operated.

SUMMARY

According to an embodiment of the present disclosure, there is provided a signal generation device including a memory configured to store instructions, and a processor communicatively connected to the memory and configured to execute the stored instructions to function as: a signal generation unit configured to generate a sound signal based on key operation data associated with a key operation; and a decay control unit configured to control a decay speed of the sound signal based on pedal operation data associated with a pedal operation position, wherein the decay control unit is further configured to control the decay speed to a first speed in a case where the pedal operation position is present in a first range in a changeable range of the pedal operation position, wherein the decay control unit is further configured to control the decay speed to a second speed greater than the first speed in a case where the pedal operation position is in a second range adjacent to the first range, and wherein a first boundary position between the first range and the second range is determined based on control information obtained by the key operation.

According to an embodiment of the present disclosure, there is provided a signal generation method including generating a sound signal based on key operation data associated with a key operation, and controlling a decay speed of the sound signal based on pedal operation data associated with a pedal operation position, wherein controlling the decay speed of the sound signal includes: determining a first boundary position between a first range in a changeable range of the pedal operation position and a second range adjacent to the first range based on control information obtained by the key operation; and controlling the decay speed to a first speed in a case where the pedal operation position is in the first range, and to a second speed greater than the first speed in a case where the pedal operation position is in the second range.

According to an embodiment of the present disclosure, there is provided a non-transitory computer-readable medium having stored thereon a program for causing a computer to execute operations including generating a sound signal based on key operation data associated with a key operation, and controlling a decay speed of the sound signal based on pedal operation data associated with a pedal operation position, wherein controlling the decay speed of the sound signal includes, determining a first boundary position between a first range in a changeable range of the pedal operation position and a second range adjacent to the first range based on control information obtained by the key operation; and controlling the decay speed to a first speed in a case where the pedal operation position is in the first range; and to a second speed greater than the first speed in a case where the pedal operation position is in the second range.

DESCRIPTION OF EMBODIMENTS

Figure 1:
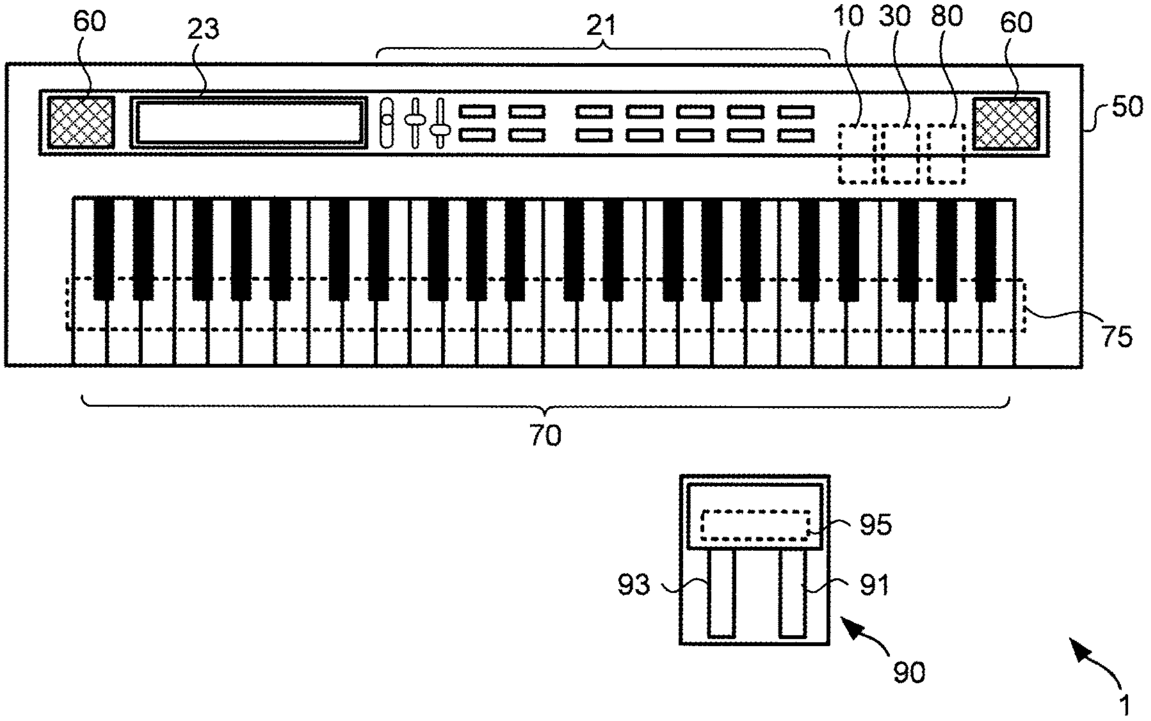
FIG. 1 is a diagram showing a configuration of a keyboard instrument according to an embodiment.

The decay of a sound generated in an electronic instrument is controlled according to a position of a damper pedal. In the case of an electronic piano, this decay is controlled by assuming that a damper is away from a string (damper-on) or the damper is in contact with the string (damper-off). The decay may be controlled by assuming that the damper is slightly in contact with the string (half-pedal). The control corresponding to each state is executed corresponding to a plurality of setting ranges determined by dividing an operable range of the damper pedal in advance. The plurality of setting ranges does not change from a predetermined setting range regardless of a state of performance.

According to the present disclosure, a position when changing the decay control by an operation of the damper pedal can be adjusted according to a state of performance.

Hereinafter, a keyboard instrument according to an embodiment of the present disclosure will be described in detail with reference to the drawings. The following embodiments are examples of embodiments of the present disclosure, and the present disclosure is not to be construed as being limited to these embodiments. Also, in the drawings referred to in the present embodiments, the same portions or portions having similar functions are denoted by the same symbols or similar symbols (signs each formed simply by adding A, B, etc. to the end of a number), and a repetitive description thereof may be omitted.

Embodiments

[Configuration of Keyboard Instrument]

FIG. 1 is a diagram showing a configuration of a keyboard instrument according to an embodiment. The keyboard instrument 1 is, for example, an electronic keyboard instrument such as an electronic piano, and is an example of an electronic instrument having a plurality of keys 70 as a performance operating element. When a user operates the key 70, a sound is generated from speakers 60. The type of sound (timbre) to be generated is changed by using an operation unit 21. In this example, the keyboard instrument 1 can generate a sound close to an acoustic piano when generating a sound using the timbre of a piano. Especially, the keyboard instrument 1 can generate a sound reflecting an effect of the damper more accurately in a performance using the damper pedal. Next, each configuration of the keyboard instrument 1 will be described in detail.

The keyboard instrument 1 includes the plurality of keys 70, a housing 50, and a pedal device 90. The plurality of keys 70 is rotatably supported by the housing 50. The operation unit 21, a display unit 23, and the speakers 60 are arranged on the housing 50. A control unit 10, a memory unit 30, a key operation measurement unit 75, and a sound source unit 80 are arranged inside the housing 50. The pedal device 90 includes a damper pedal 91, a shift pedal 93, and a pedal operation measurement unit 95. Each of the units arranged inside the housing 50 are connected via a bus.

In this example, the keyboard instrument 1 includes an interface for inputting and outputting a signal to and from an external device. The interface is, for example, a terminal for outputting a sound signal, a cable connecting terminal for transmitting and receiving MIDI data, or the like. In this example, the pedal device 90 is connected to the interface so that the pedal operation measurement unit 95 is connected to each of the units arranged inside the housing 50 via the bus described above.

The control unit 10 includes a calculation processing circuit, such as a CPU, and a memory device, such as a RAM, a ROM, and the like. The control unit 10 executes a control program using a CPU to realize various functions in the keyboard instrument 1. The operation unit 21 is a device such as an operation button, a touch sensor, and a slider, and outputs a signal corresponding to the input operation to the control unit 10. The display unit 23 displays a screen based on the control by the control unit 10.

The memory unit 30 is a memory device such as non-volatile memory. The memory unit 30 stores a control program executed by the control unit 10. The memory unit 30 may store parameters, waveforms, etc. used in the sound source unit 80. Each of the speakers 60 amplifies and outputs a sound signal output from the control unit 10 or the sound source unit 80 to generate a sound corresponding to the sound signal.

The key operation measurement unit 75 measures the operation of each of the plurality of keys 70, and outputs measurement data indicating a measurement result. The measurement data includes information (KC, KS, and KV). That is, the key operation measurement unit 75 outputs information (KC, KS, KV) in response to a pushing operation to each of the plurality of keys 70. The information KC is information that identifies the operated key 70 (e.g., a key number). The information KS is information indicating a pushing amount of the key 70. The information KV is information indicating a pushing speed of the key 70. By outputting the information KC, KS, and KV in association with each other, the operated key 70 and the operation content with respect to the key 70 are identified by the measurement data output from the key operation measurement unit 75.

The pedal operation measurement unit 95 measures each operation of the damper pedal 91 and the shift pedal 93, and outputs measurement data indicating the measurement result. This measurement data includes information (PC, PS). The information PC is information indicating whether the operated pedal is the damper pedal 91 or the shift pedal 93. The information PS is information indicating the pushing amount of the pedal. In the following description, the pushing amount of the pedal may be referred to as a pedal operation position. By outputting the information PC and PS in associated with each other, the operated pedal (the damper pedal 91 or the shift pedal 93) and the operation content for the operated pedal (pushing amount) is identified by the measurement data output from the pedal operation measurement unit 95. Also, if the pedal of the pedal device 90 is only the damper pedal 91, there may be no information PC.

The sound source unit 80 generates a sound signal based on the measurement data input from the key operation measurement unit 75 and the pedal operation measurement unit 95 and outputs to the speakers 60. The sound signal generated by the sound source unit 80 is obtained for each operation to the key 70. Then, a plurality of sound signals obtained corresponding to a plurality of keypresses is synthesized and output from the sound source unit 80. A configuration of the sound source unit 80 will be described in detail.

[Configuration of Sound Source Unit]

Figure 2:
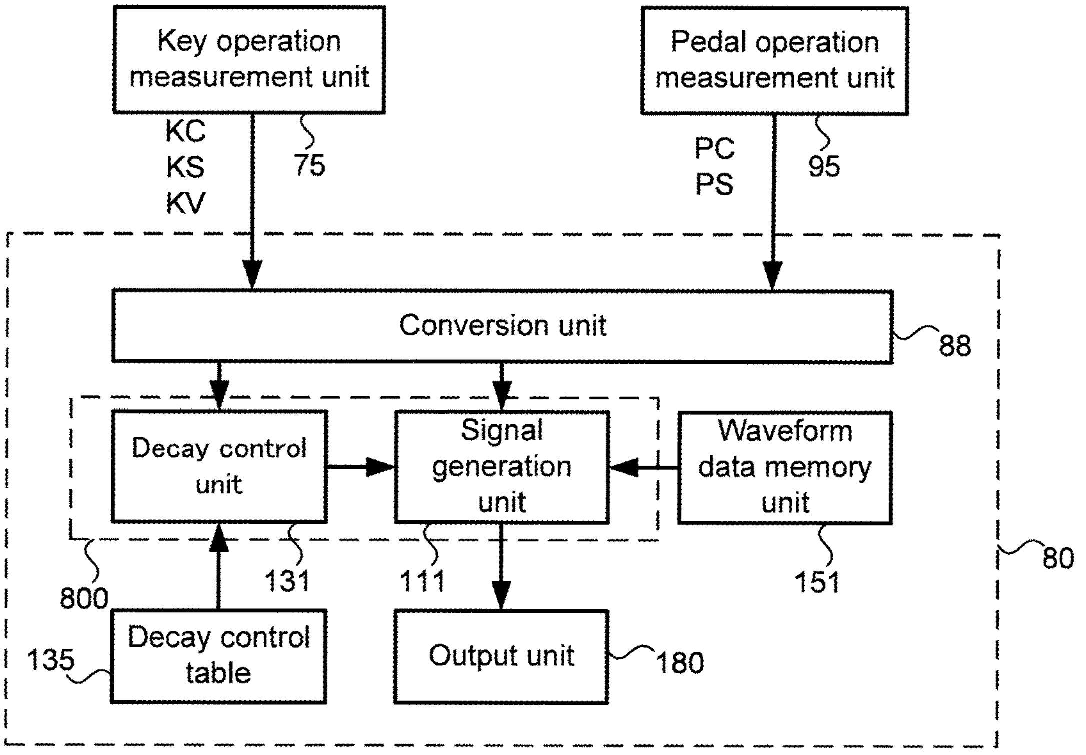
FIG. 2 is a block diagram showing a functional configuration of a sound source unit according to an embodiment.

FIG. 2 is a diagram showing a functional configuration of a sound source unit according to an embodiment. The sound source unit 80 includes a conversion unit 88, a sound signal generation unit (a signal generation device) 800, a decay control table 135, a waveform data memory unit 151 and an output unit 180. The sound signal generation unit 800 includes a signal generation unit 111 and a decay control unit 131 and executes a signal generation method including a decay control processing.

The conversion unit 88 converts the input information (KC, KS, KV, PC, PS) into control data in a format used in the sound signal generation unit 800. That is, information having different meanings is converted into control data in a common format. The control data is data for defining the content of the sound generation. In this example, the conversion unit 88 converts the input information into MIDI format control data. The conversion unit 88 outputs the generated control data to the sound signal generation unit 800 (the signal generation unit 111 and the decay control unit 131).

The conversion unit 88 generates control data related to the operation to the key 70 (hereinafter referred to as key operation data) based on the information (KC, KS, KV) input from the key operation measurement unit 75. In this example, the key operation data includes information indicating the position of the operated key 70 (note number), information indicating that the key was pressed (note-on), information indicating that the key was released (note-off), and an operation speed to the key 70, that is, a keypress speed (velocity: 0 to 127 in this example). As described above, the conversion unit 88 also functions as a key operation data generation unit for generating the key operation data.

In addition, the conversion unit 88 generates control data associated with the operation of the damper pedal 91 (hereinafter, referred to as pedal operation data) based on the information (PC, PS) input from the pedal operation measurement unit 95. The pedal operation data includes information indicating at least the pedal operation position.

The damper-on, damper-off, and half-damper used in the following description are defined as follows. The damper-on indicates a state in which the damper is perfectly away from the string in the acoustic piano. The damper-on not only corresponds to a state in which the operation position of the damper pedal 91 is at an end position (a state in which the damper is completely raised) but also to a state in which the operation position of the damper pedal 91 is included in a predetermined range including the end position (a range set in advance as being equivalent to that the end position). In the following description, the range of the operation position of the damper pedal 91 serving as the damper-on may be referred to as a damper-on range.

The damper-off indicates a state in which the damper is completely lowered. The damper-off not corresponds to a state in which the operation position of the damper pedal 91 is in a rest position (a state in which the damper is completely lowered) but also to a state in which the operation position of the damper pedal 91 is included in a predetermined range including the rest position (a range set in advance as being equivalent to the reset state). In the following description, the range of the operation position of the damper pedal 91 serving as the damper-off may be referred to as a damper-off range.

The half-damper includes information (half-damper) and the like indicating that the state is in an intermediate position (half-pedal) excluding the rest position and the end position. Also, the pedal is operable in the range from the rest position to the end position.

The half-damper corresponds to a state in which the operation position of the damper pedal 91 is included in the range sandwiched between the damper-off range and the damper-on range (a state of the half-pedal). In the following description, the range of the operation position of the damper pedal 91 serving as the half-damper may be referred to as a half-damper range. The damper-off range is adjacent to the half-damper range. The half-damper range is adjacent to the damper-on range. The damper-on range (first range), the half-damper range (second range), and the damper-off range (third range) may be collectively referred to as a damper setting range.

As described above, the conversion unit 88 also functions as a pedal operation data generation unit for generating the pedal operation data. In addition, control data corresponding to the shift pedal 93 may also be generated, but the description thereof will be omitted here.

The conversion unit 88 outputs the generated control data to the sound signal generation unit 800 (the signal generation unit 111 and the decay control unit 131). Specifically, the conversion unit 88 outputs the key operation data to the signal generation unit 111 and the decay control unit 131, and outputs the pedal operation data to the decay control unit 131.

The waveform data memory unit 151 stores at least piano sound waveform data. The piano sound waveform data is waveform data obtained by sampling an acoustic piano sound (sound generated by striking a string with a keypress).

The signal generation unit 111 generates and outputs a sound signal based on the key operation data input from the conversion unit 88. At this time, the decay control unit 131 adjusts an envelope of the sound signal.

The decay control unit 131 refers to the decay control table 135 and controls the envelope of the sound signal generated in the signal generation unit 111 based on the key operation data and the pedal operation data input from the conversion unit 88. In particular, the envelope when the sound signal is decayed is controlled. In this example, the decay control unit 131 refers to the decay control table 135 and determines the damper setting range based on the key operation data. The decay control unit 131 uses the determined damper setting range to control the decay speed based on the pedal operation data. The decay control table 135 is a table that defines a relationship between the note number and the damper setting range.

More specifically, the decay control unit 131 refers to the decay control table 135 to determine the damper setting range corresponding to the note number in the key operation data. The decay control unit 131 controls the decay speed in accordance with the damper setting range so as to correspond to the damper-on if the operation position of the damper pedal 91 in the pedal operation data is in the damper-on range. Similarly, the decay control unit 131 controls the decay speed so as to correspond to the damper-off if the operation position of the damper pedal 91 is the damper-off range and controls the decay speed so as to correspond to the half-damper if the operation position of the damper pedal 91 is the half-damper range. The decay control table 135 is a table that defines the relationship between the note number and the damper setting range.

The output unit 180 outputs the sound signal generated by the signal generation unit 111 to the outside of the sound source unit 80. In this example, a sound signal is output to the speakers 60 and listened to by the user. Next, a detailed configuration of the signal generation unit 111 will be described.

[Configuration of Signal Generation Unit]

Figure 3:
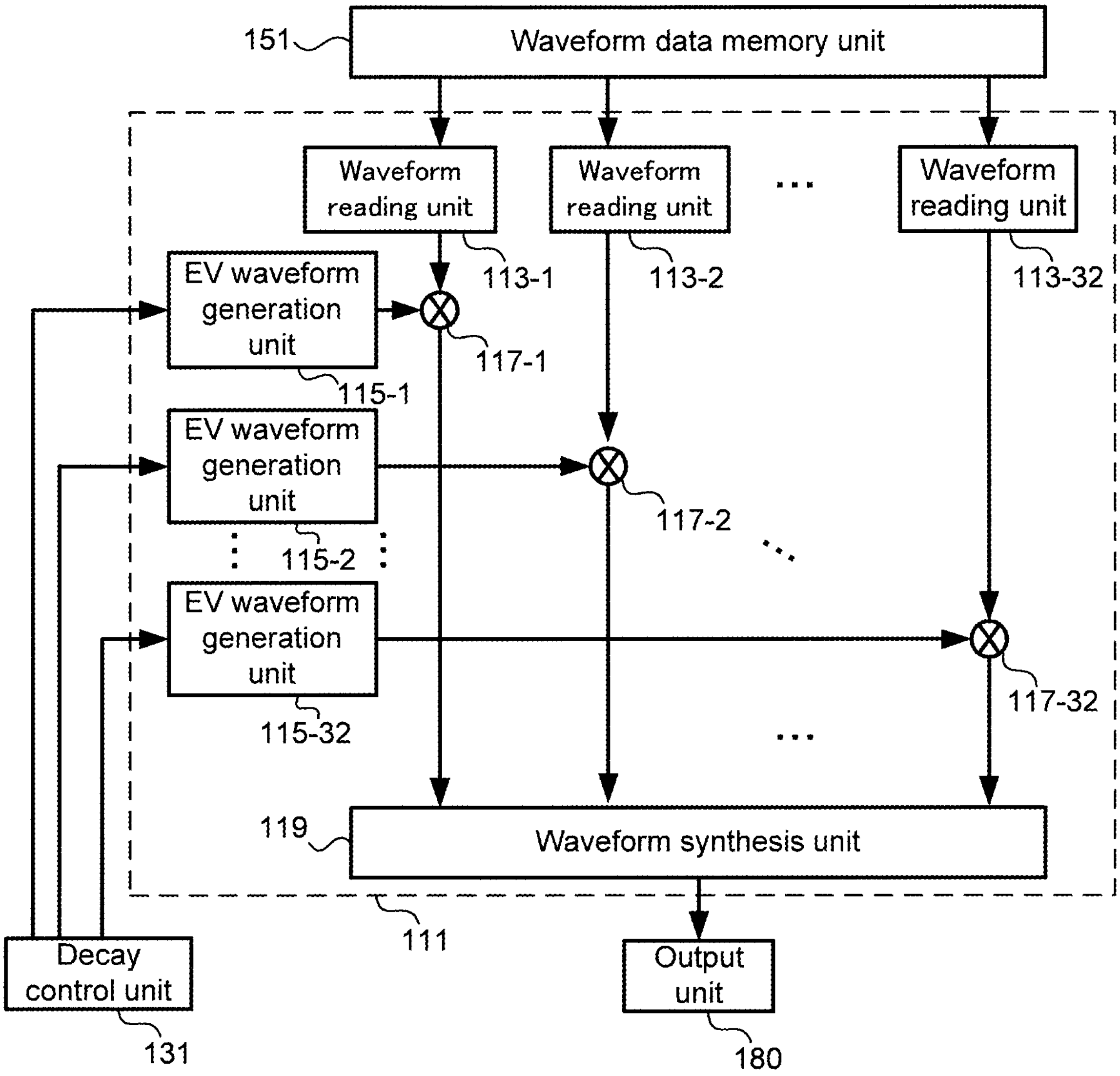
FIG. 3 is a block diagram showing a functional configuration of a signal generation unit according to an embodiment.

FIG. 3 is a block diagram showing a functional configuration of a signal generation unit according to an embodiment. The signal generation unit 111 includes a waveform reading unit 113 (waveform reading units 113-1, 113-2, . . . 113-*n*), an EV (envelope) waveform generation unit 115 (EV waveform generation units 115-1, 115-2, . . . , 115-*n*), a multiplier 117 (multipliers 117-1, 117-2, . . . 117-*n*), and a waveform synthesis unit 119. The above "n" corresponds to the number of sounds that can be sounded at the same time (the number of sound signals that can be generated at the same time) and is 32 in this example. That is, according to this signal generation unit 111, the state of sounding 32 times of key depression is maintained, when a 33rd key depression occurs, the sound signal corresponding to the first sound generation is forcibly stopped.

The waveform reading unit 113-1 selects and reads out waveform data to be read out from the waveform data memory unit 151 based on the key operation data obtained from the conversion unit 88 and generates a sound signal having a pitch corresponding to the note number. In this example, the piano sound waveform data is read out. The EV waveform generation unit 115-1 generates an envelope waveform based on the key operation data obtained from the conversion unit 88 and a preset parameter. The generated envelope waveform is partially adjusted by the decay control unit 131. A method of generating the envelope waveform and a method of adjusting the envelope waveform will be described later. The multiplier 117-1 multiplies the sound signal generated by the waveform reading unit 113-1 by the envelope waveform generated by the EV waveform generation unit 115-1.

Although the case where n=1 is exemplified, the key operation data corresponding to the key depression is applied in order of n=2, 3, 4, . . . every time the next key depression occurs while the sound signal is output from the multiplier 117-1. For example, in the case of the next key depression, the key operation data is applied to the configuration of n=2, and the sound signal is output from the multiplier 117-2 in the same manner as described above. The waveform synthesis unit 119 synthesizes and outputs the sound signal output from the multipliers 117-1, 117-2, . . . , 117-32 to the output unit 180.

[Envelope Waveform]

The envelope waveform generated in the EV waveform generation unit 115 will be described. First, a general envelope waveform and parameter will be described.

Figure 4:
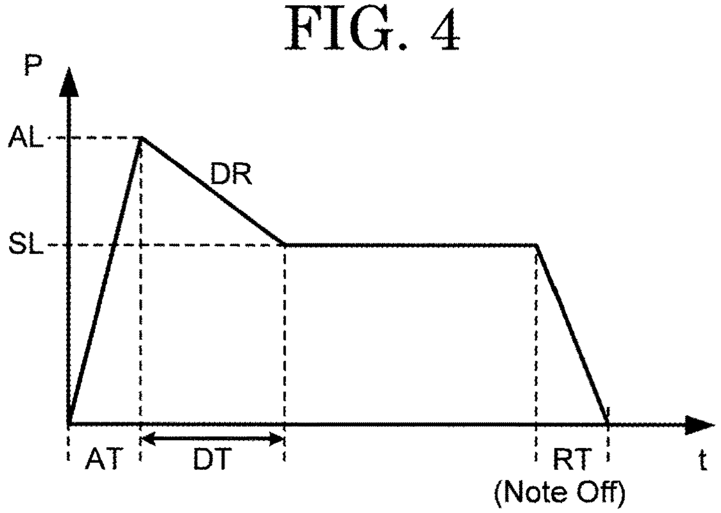
FIG. 4 is a diagram illustrating a definition of a general envelope waveform.

FIG. 4 is a diagram illustrating a definition of a general envelope waveform. As shown in FIG. 4, the envelope waveform is defined by a plurality of parameters. The plurality of parameters includes an attack level AL, an attack time AT, a decay time DT, a sustain level SL, and a release time RT. Also, the attack level AL may be fixed to a maximum value (e.g., 127). In this case, the sustain level SL is set in a range of 0 to 127.

When the note-on occurs, the waveform rises to the attack level AL in the time of the attack time AT. Thereafter, the waveform decreases to the sustain level SL in the time of the decay time DT and keeps the sustain level SL. When the note-off occurs, the waveform decreases from the sustain level SL to the mute state (level "0") in the time of the release time RT. If there is the note-off before reaching the sustain level SL, i.e., during the attack time AT and the decay time DT, the waveform reaches a mute state in the time of the release time RT from that point. Also, it may be reached the mute state with the decay factor in which the sustain level SL is divided by the release time RT.

A decay rate DR is a value that can be calculated from the above-mentioned parameters, and is obtained by dividing the difference between the attack level AL and the sustain level SL by the decay time DT. This parameter (the decay rate DR) indicates the degree of natural decay (decay speed) of a sound in a decay period after the note-on. Although an example that the decay speed of the decay rate DR in the decay period is constant (the slope is a straight line) has shown, the decay speed does not have to be constant. That is, the slope may be defined as a line other than a straight line by changing the decay speed in a predetermined manner.

Figure 5:
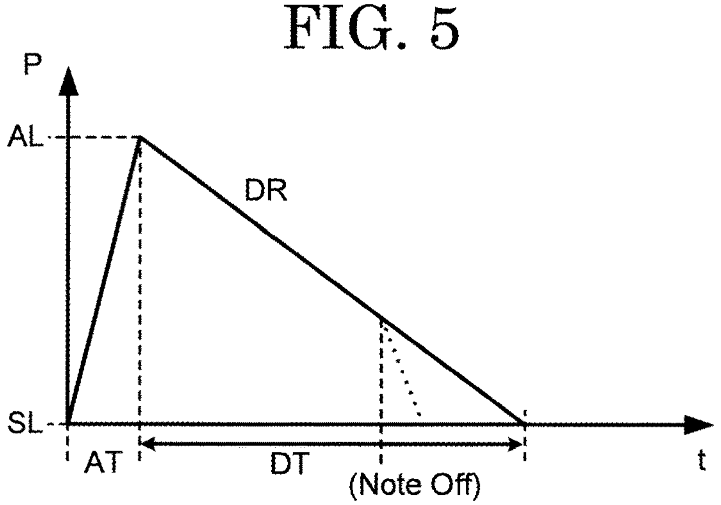
FIG. 5 is a diagram illustrating an example of an envelope waveform of a piano sound.

FIG. 5 is a diagram illustrating an example of an envelope waveform of the piano sound. In a typical piano sound, for example, the sustain level SL is set to "0" and the decay time DT is set relatively long (the decay rate DR is small). This state indicates the state where the damper is away from the string (damper-on). If the note-off occurs in the decay time DT, the damper is in contact with the string (damper-off) and decays rapidly as shown by the dotted lines according to the setting of the release time RT. The EV waveform generation unit 115 in this example generates the envelope waveform shown in FIG. 5, and the decay rate DR is adjusted by the decay control unit 131. When the damper is on, the decay control unit 131 controls the decay rate DR (decay speed) to be slower than when the damper is off. When the damper is the half-damper, the decay control unit 131 controls the decay rate DR (decay speed) to be faster than when the damper is on, while it is slower than when the damper is off.

The decay coefficient K is used as one of the parameters for controlling the decay speed in this way. In this example, when the controlled decay rate is DRf, it is calculated as $DRf=DR\times K$. That is, the larger the decay coefficient K, the faster the decay speed. In the damper-on state, the decay coefficient K is "1" and the DRf corresponding to the decay speed is the same as the decay rate DR. The decay coefficient K in the state of the half-damper is "Kh". "Kh" is a value larger than "1", and DRf corresponding to the decay speed is "$DR\times Kh$". The decay speed in the state of the damper-off is a value larger than the decay speed "$DR\times Kh$" in the state of the half-damper because it corresponds to the decay speed corresponding to the release time RT.

These parameters are described as setting values defining the envelope waveform, and each level such as the attack level AL is a relative value. Therefore, in the envelope waveform output from the EV waveform generation unit 115, i.e., the envelope waveform multiplied by the sound signal in the multiplier 117, the absolute value of the output level is adjusted according to the velocity. Also, adjustment of the output level may be realized by an amplifier circuit.

[Decay Control Table]

The decay control unit 131 determines the damper setting range corresponding to the note number by referring to the decay control table 135 as described above. That is, if the note numbers corresponding to the two sounds are different from each other, the damper setting range corresponding to the two sounds are also determined to be different from each other. Therefore, depending on the operation position of the damper pedal 91, for example, the sound controlled by the damper-off and the sound controlled by the half-damper may generated at the same time.

Figure 6:
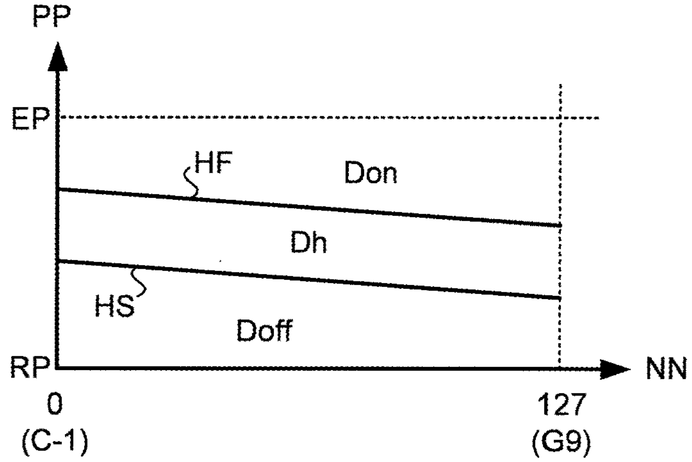
FIG. 6 is a diagram illustrating a relationship between a damper setting range and a note number defined in a decay control table according to an embodiment.

FIG. 6 is a diagram illustrating a relationship between the damper setting range and the note number defined in the decay control table according to an embodiment. A note number (NN) is shown on the horizontal axis. In this example, the horizontal axis is defined in the range from the note number "0" (corresponding to the pitch "C-1") to the note number "127" (corresponding to the pitch "G9"). The operation position of the damper pedal 91 is shown on the vertical axis. In this example, the vertical axis is defined in a range in which the operation position of the damper pedal 91 can be changed, that is, in a range from a rest position RP to an end position EP.

A boundary position HS indicates a boundary position (second boundary position) between a damper-off range Doff (third range) and a half-damper range Dh (second range). A boundary position HF indicates a boundary position (first boundary position) between the half-damper range Dh (second range) and a damper-on range Don (first range). In the example shown in FIG. 6, the damper setting range is determined so that the larger the note number, that is, the higher the pitch, both the boundary position HS and the boundary position HF gradually become closer to the rest position RP. In other words, the boundary position HS and the boundary position HF corresponding to the second pitch higher than the first pitch is closer to the rest position RP than the boundary position HS and the boundary position HF corresponding to the first pitch. In this example, the difference between the boundary position HS and the boundary position HF, that is, the size of the half-damper range Dh, is constant regardless of the note number. The boundary position HS and the boundary position HF may be calculated by a predetermined arithmetic expression using the note number as a variable.

[Decay Control Processing]

Figure 7:
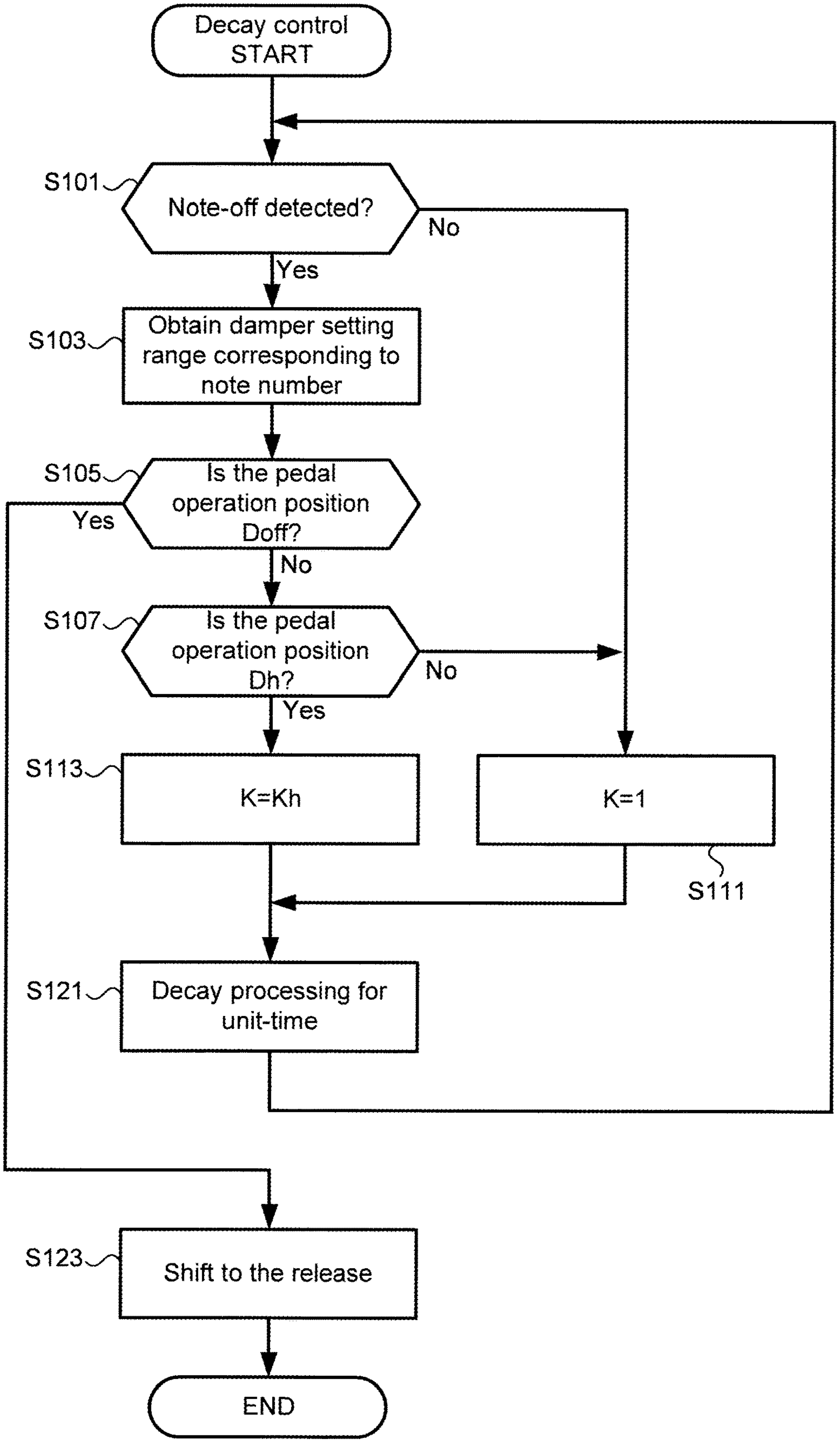
FIG. 7 is a flowchart showing a decay control processing according to an embodiment.
Figure 8:
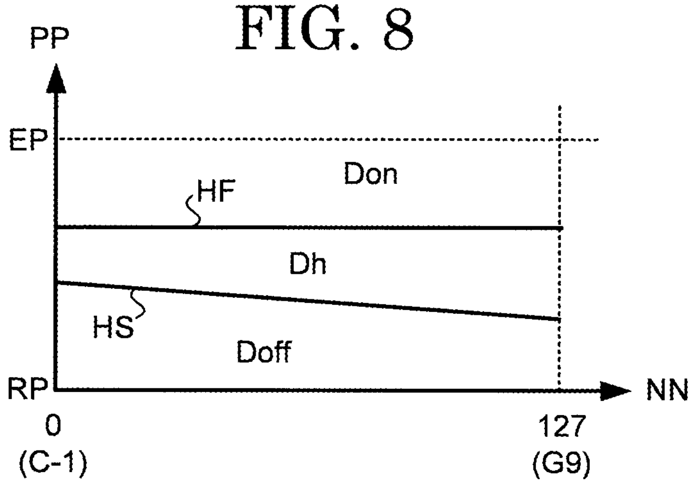
FIG. 8 is a diagram illustrating a relationship between a damper setting range and a note number defined in a decay control table according to a modification.

FIG. 7 is a flowchart showing a decay control processing according to an embodiment of the present disclosure. When the note-on is detected based on the key operation data and the waveform data is read out (more particularly, when reached the decay period), the decay control processing is executed on a sound generated corresponding to each note-on. The sound to be subjected to the decay control processing may be referred to as a processing target sound. Therefore, as shown in FIG. 3, if the number that can be sounded at the same time is 32, the decay control processing of 32 at maximum is executed in parallel.

First, the decay control unit 131 determines whether the note-off has been detected based on the key operation data from the previous determination to the present determination (step S101). In the case where the note-off corresponding to the processing target sound has not been detected (step S101; No), to cope with the key depressed state, the decay control unit 131 sets the decay coefficient K to “1” regardless of the damper pedal state (step S111). That is, the decay speed is set with the normal decay rate DRf (=DR×1). The decay control unit 131 executes a decay processing for unit time (step S121) and returns to step S101 to continue the processing. The unit time is a time corresponding to a predetermined processing unit, and corresponds to, for example, a processing time at one clock.

In the case where the note-off corresponding to the processing target sound is detected (step S101; Yes), the decay control unit 131 acquires a note number corresponding to the processing target sound (note number corresponding to note-off) and refers to the decay control table 135 to acquire the damper setting range corresponding to the note number (step S103). Subsequently, based on the damper setting range, the decay control unit 131 determines whether the operation position of the damper pedal 91 is included in the damper-on range Don, the half-damper range Dh, and the damper-off range Doff. In this example, the decay control unit 131 determines whether the operation position of the damper pedal 91 is the damper-off range Doff and whether it is the half-damper range Dh (step S105, S107).

In the case where the operation position of the damper pedal 91 is the damper-on range Don (step S105; No, step S107; No), to cope with the damper-on in a key-released state, the decay control unit 131 executes the processing of the step S111 and step S121 described above and returns to the step S101 to continue the processing.

In the case where the operation position of the damper pedal 91 is the half-damper range Dh (step S105; No, step S107; Yes), to cope with the half-damper in the key-released state, the decay control unit 131 sets the decay coefficient K to “Kh” (step S113). The decay control unit 131 executes a decay processing for unit time with the decay rate DRf (DR×Kh) determined by the set decay coefficient K (step S121) and returns to the step S101 to continue the processing.

In the case where the operation position of the damper pedal 91 is the damper-off range Doff (step S105; Yes), to cope with the damper-off in the key-released state, the decay control unit 131 shifts to the release (step S123) and terminates the decay control processing. That is, the decay control unit 131 controls to switch from the decay speed with the decay rate DRf to the decay speed corresponding to the release period.

In an acoustic piano, the higher the pitch, the smaller the amplitude of the string tends to be. Therefore, when returning the damper pedal to the rest position from the end position, the lower the pitch and the larger the amplitude of the string, the easier it is for the damper to come into contact with the string. According to the decay control processing described above, the higher the note number (higher pitch), the closer the operation position from the damper-off to the half-damper and the operation position from the half-damper to the damper-on is to the rest position RP. As a result, since the operation position of the damper pedal 91 at the time of changing the decay control can be changed according to the state of the performance (the pitch of the key to be operated), a player can obtain a feeling close to the performance of the acoustic piano.

<Modifications>

While an embodiment of the present disclosure has been described above, the present disclosure is not limited to the above-described embodiment, and various other modifications are included. For example, the above-described embodiments have been described in detail for the purpose of illustrating the present disclosure easily and are not necessarily limited to those including all the configurations described. In addition, other configurations can be added, deleted, or replaced for some of the configurations of the respective embodiments. Hereinafter, some modifications will be described. The modifications described below can also be applied in combination with each another.

(1) The decay control table 135 described above is not limited to the example described in an embodiment (FIG. 6). In the example shown in FIG. 6 described above, the damper setting range is defined in the decay control table 135 so as to satisfy the following two conditions.

(a) As the note number is larger, both the boundary position HS and the boundary position HF gradually become closer to the rest position RP.

(b) The difference between the boundary position HS and the boundary position HF, that is, the magnitude of the half-damper range Dh, is constant regardless of the note number.

In the present modification, a plurality of examples of the relationship between the damper setting range and the note number will be described. Each example is not limited to the case where the objective is to obtain a playing feel close to an acoustic piano. That is, it is sufficient that the damper setting range may be changed depending on the situation of the performance, and the purpose thereof is various.

Since the timbre used varies depending on the desired effect, the waveform data is not limited to those obtained by sampling the sound of an acoustic piano. In other words, the waveform data may be obtained by sampling a sound of an electric piano or may be obtained by sampling a sound of other musical instruments. In addition, the waveform data may be generated by synthesizing or modulating predetermined waveform data. Depending on the timbre selected as the target to be sounded, a particular table may be selected from the plurality of types of decay control table 135 exemplified below and may be referenced by the decay control unit 131.

FIG. 8 to FIG. 14 are diagrams illustrating the relationship between the damper setting range and the note number defined in the decay control table in the modification. In the example shown in FIG. 8, the larger the note number, the boundary position HS (the first boundary position) gradually becomes closer to the rest position RP, but the inclination indicating the boundary position HF is smaller than that of the example shown in FIG. 6, and here, it is constant regardless of the note number. As a result, the larger the note number, the larger the half-damper range Dh. As described above, only between the half-damper range (first range) Dh with the decay speed of "DR×Kh" (first speed) and the damper-off range Doff (second range) with the decay speed of the speed according to the release time RT (second speed), the boundary position may be changed by the note number. On the other hand, unlike an embodiment, between the half-damper range Dh (first range) with the decay speed of "DR×Kh" (first speed) and the damper-on range Don (third range) with the decay speed of "DR×1" (third speed), the boundary position may not be changed by the note number.

Figure 9:
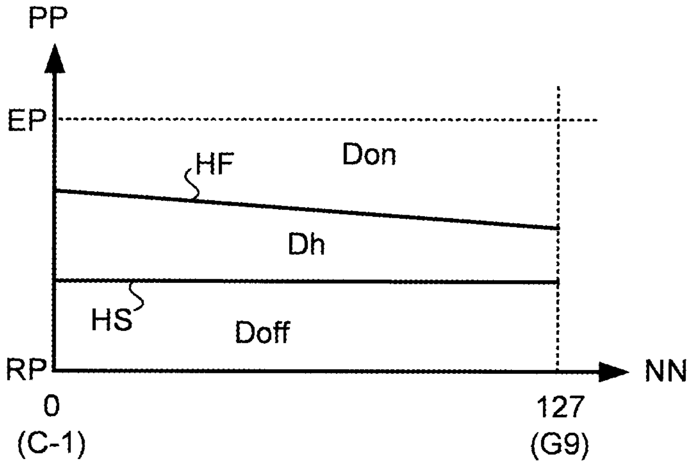
FIG. 9 is a diagram illustrating a relationship between a damper setting range and a note number defined in a decay control table according to a modification.

In the example shown in FIG. 9, the larger the note number, the boundary position HF (the first boundary position) gradually becomes closer to the rest position RP, but the inclination indicating the boundary position HS is smaller than that of the example shown in FIG. 6, and here, it is constant regardless of the note number. As a result, the larger the note number, the smaller the half-damper range Dh. As described above, only between the damper-on range Don (first range) with the decay speed of "DR×1" (first speed) and the half-damper range Dh (second range) with the decay speed of "DR×Kh" (second speed), the boundary position may be changed by the note number. On the other hand, unlike an embodiment, between the half-damper range Dh (first range) with the decay speed of "DR×Kh" (first speed) and the damper-off range Doff (third range) with the decay speed of the speed according to the release time RT (third speed), the boundary position may not be changed by the note number.

Figure 10:
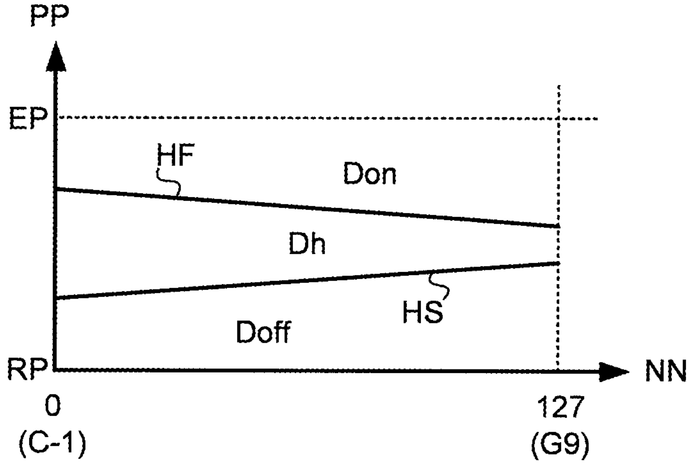
FIG. 10 is a diagram illustrating a relationship between a damper setting range and a note number defined in a decay control table according to a modification.

In the example shown in FIG. 10, the larger the note number, the boundary position HS gradually becomes closer to the end position EP, but the larger the note number, the boundary position HF gradually becomes closer to the rest position RP. As a result, the larger the note number, the smaller the half-damper range Dh.

As described above, in an acoustic piano, when the damper pedal is returned from the end position to the rest position, the lower the pitch of the string (the string whose vibration tends to be larger), the easier it is for the damper to contact with the string. On the other hand, when it becomes half-damper, the vibration is limited for the string of any pitch, it is also considered to have approximately the same amplitude. Assuming such a case, the position of the damper pedal does not depend on the pitch when the damper is turned off from the half-damper. Therefore, as shown in FIG. 9, it can also be considered that it is closer to the acoustic piano when the position to shift from the half-damper range Dh to the damper-off-range Doff, i.e., the boundary position HS is constant regardless of the pitch.

In addition, even in the state of half-damper and vibration is restricted, it is considered that string vibration to the opposite side of the damper is apt to occur, because the kinetic energy of the string is higher in the lower pitch. Assuming such a case, in order to be in the damper-off state, the lower the pitch, the closer the damper pedal must be to the rest position. Therefore, as shown in FIG. 10, it can also be considered that it is closer to the acoustic piano when the boundary position HS is made closer to the rest position RP as the pitch is lower.

Figure 11:
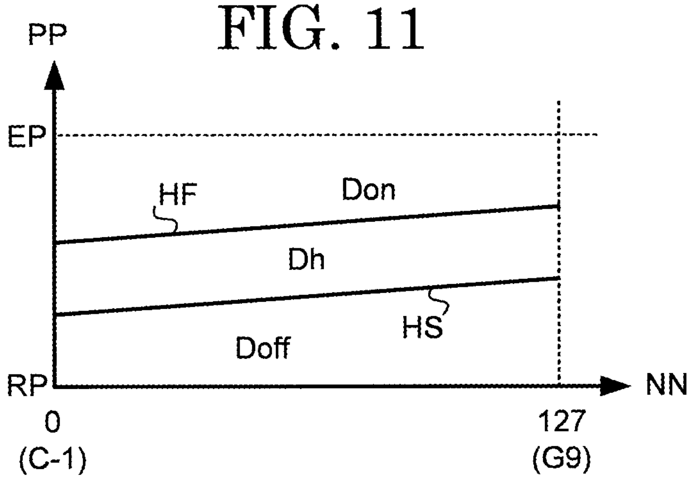
FIG. 11 is a diagram illustrating a relationship between a damper setting range and a note number defined in a decay control table according to a modification.

In the example shown in FIG. 11, it is opposite to the example shown in FIG. 6, and the larger the note number, the boundary position HS and the boundary position HF gradually become closer to the end position EP. As a result, the half-damper range Dh is constant regardless of the note number. As described above, the boundary position HS and the boundary position HF may have different inclinations when the note number changes or may become closer to the end position EP as the note number becomes larger.

Figure 12:
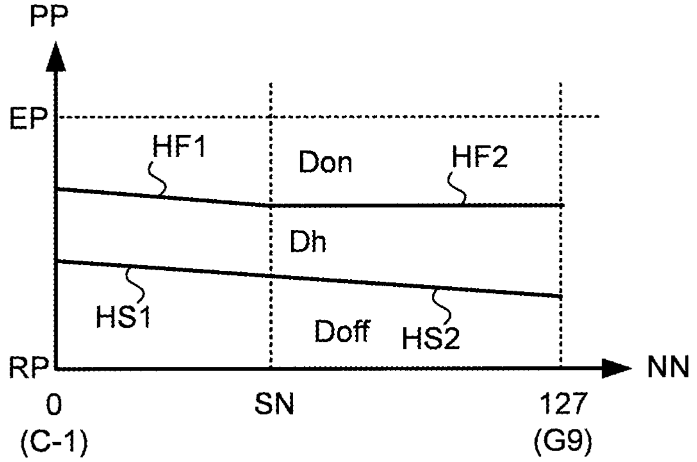
FIG. 12 is a diagram illustrating a relationship between a damper setting range and a note number defined in a decay control table according to a modification.

In the example shown in FIG. 12, the decay control table 135 defines a boundary position HS1 and a boundary position HF1 corresponding to a note number smaller than the specific note number SN, and a boundary position HS2 and a boundary position HF2 corresponding to a note number larger than the specific note number SN. In this example, the boundary position HS1 and the boundary position HS2 are the same as the boundary position HS described above. On the other hand, the inclination indicating the boundary position HF2 is smaller than the inclination indicating the boundary position HF1, and here, it is constant regardless of the note number. As described above, at least one of the boundary position HS and the boundary position HF may have different inclinations in a range smaller than the specific note number SN and a range larger than the specific note number SN. The range of the note number is divided into two ranges by one specific note number SN, but it may be divided into three or more ranges. The position to be divided may be different between the boundary position HS and the boundary position HF.

Figure 13:
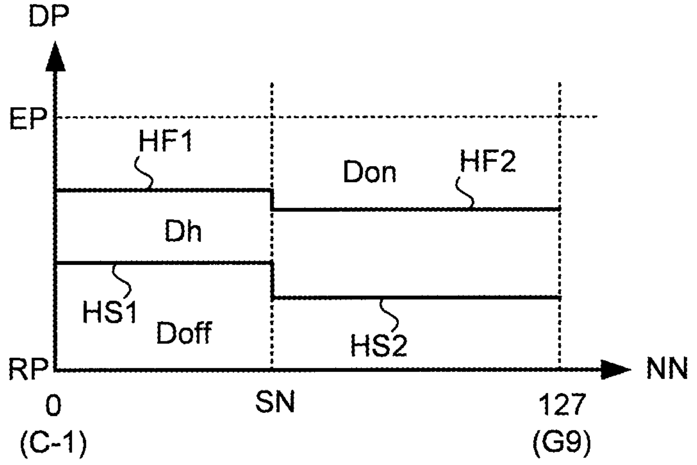
FIG. 13 is a diagram illustrating a relationship between a damper setting range and a note number defined in a decay control table according to a modification.

In the example shown in FIG. 13, the decay control table 135 defines the boundary position HS1 and the boundary position HF1 corresponding to the note number smaller than the specific note number SN, and the boundary position HS2 and the boundary position HF2 corresponding to the note number larger than the specific note number SN. The boundary position HS1, the boundary position HS2, the boundary position HF1, and the boundary position HF2 are all constant regardless of the note number. On the other hand, the boundary position HS1 is closer to the end position EP than the boundary position HS2, and the boundary position HF1 is closer to the end position EP than the boundary position HF2. That is, in the specified note number SN, the boundary position HS1 and the boundary position HS2 are discontinuous, and the boundary position HF1 and the boundary position HF2 are discontinuous. As described above, at least one of the boundary position HS and the boundary position HF may be discontinuous in a range smaller than the specific note number SN and in a range larger than the specific note number SN. The range of the note number is divided into two ranges by one specific note number SN, but it may be divided into three or more ranges. The position to be divided may be different between the boundary position HS and the boundary position HF.

Figure 14:
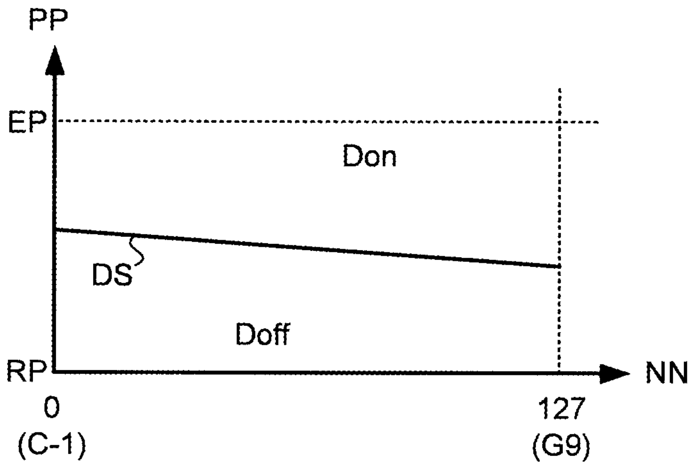
FIG. 14 is a diagram illustrating a relationship between a damper setting range and a note number defined in a decay control table according to a modification.

In the example shown in FIG. 14, the damper setting range that does not include the half-damper range Dh is defined in the decay control table 135. That is, the damper setting range includes the damper-off range Doff and the damper-on range Don. A boundary position DS indicates the boundary position between the damper-off range Doff and the damper-on range Don. The larger the note number, the boundary position DS gradually becomes closer to the rest position RP. As described above, the damper setting range is not limited to the case including three ranges, it is sufficient to include at least two ranges as exemplified in the damper-off range Doff and the damper-on range Don. The damper setting range may include four or more ranges. For example, the half-damper range Dh may be further divided into two ranges. In this case, the decay coefficient K may be small in the half-damper range Dh2 close to the damper-on range Don than the half-damper range Dh1 close to the damper-off range Doff. This makes it possible to more accurately reflect the effect of the damper when the half-pedal is operated.

(2) The decay control table 135 described above is not limited to the case where the damper setting range is determined by the note number (pitch information) as in the example shown in FIG. 6 and may be any control information obtained by the key operation 70. In the present modification, velocity (speed information), sound output level (output level information), and key acceleration (acceleration information) will be described as an example of the control information. In addition, the control information may be information indicating the operation of the key 70 and information on the sound generated by the key operation 70. In addition, for example, if the keyboard instrument 1 has a weight (configuration simulating a hammer of an acoustic piano) which is rotated by the operation to the key 70, the control information may be information indicating the operation of the weight (e.g., speed or acceleration). Also in this example, similar to the modification shown in FIG. 8 to FIG. 14 shown in the modification (1), it is possible to change the damper setting range.

Figure 15:
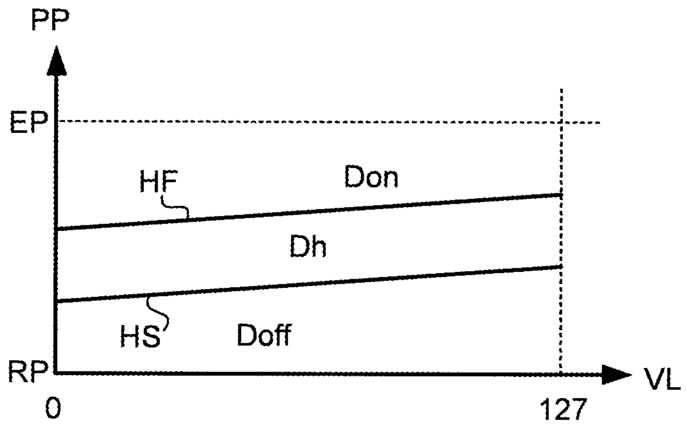
FIG. 15 is a diagram illustrating a relationship between a damper setting range and a velocity defined in a decay control table according to a modification.

FIG. 15 is a diagram illustrating the relationship between the damper setting range and the velocity defined in the decay control table in the modification. As shown in FIG. 15, the horizontal axis represents velocity (VL). In this example, the horizontal axis is defined in a range from velocity "0" (corresponding to the minimum speed of the key 70 (i.e., stop)) to velocity "127" (corresponding to the maximum speed of the key 70). The operation position of the damper pedal 91 is shown on the vertical axis. In the example shown in FIG. 15, the larger the velocity, the damper setting range is determined so that both the boundary position HS and the boundary position HF gradually close to the end position EP. In other words, the boundary position HS and the boundary position HF when the velocity is the second speed smaller than the first speed are close to the rest position RP than the boundary position HS and the boundary position HF when the velocity is the first speed. The difference between the boundary position HS and the boundary position HF, that is, the half-damper range Dh is constant regardless of velocity.

The decay control unit 131 may acquire the velocity in the key operation data and acquire the damper setting range corresponding to the velocity in the process of the step S103 shown in FIG. 7. For an acoustic piano, the greater the velocity, the larger the amplitude of the string. Therefore, when the damper pedal is returning to the rest position from the end position, the faster the key is operated and the larger the amplitude of the string, the easier it is for the damper to come into contact with the string. By determining the damper setting range based on velocity, it is also possible to get closer to the playing feel of an acoustic piano.

Figure 16:
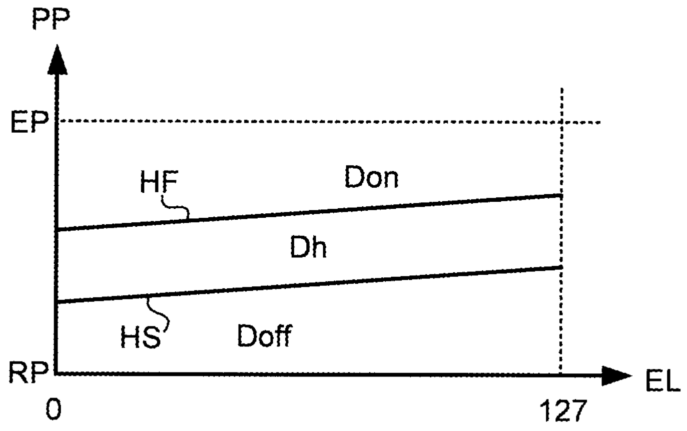
FIG. 16 is a diagram illustrating a relationship between a damper setting range and an output level defined in a decay control table according to a modification.

FIG. 16 is a diagram illustrating the relationship between the damper setting range and the output level defined in the decay control table in the modification. As shown in FIG. 16, the horizontal axis represents the output level EL. In this example, the horizontal axis is defined in the range from the output level "0" to the output level "127". The operation position of the damper pedal 91 is shown on the vertical axis. In this case, the decay control unit 131 may acquire the output level corresponding to the processing target sound from the EV waveform generation unit 115 and acquire the damper setting range corresponding to the output level in the processing of the step S103 shown in FIG. 7.

In the example shown in FIG. 16, the larger the output level, the damper setting range is determined so that both the boundary position HS and the boundary position HF gradually close to the end position EP. In other words, the boundary position HS and the boundary position HF corresponding to the second output level smaller than the first output level are close to the rest position RP than the boundary position HS and the boundary position HF corresponding to the first output level. The difference between the boundary position HS and the boundary position HF, that is, the half-damper range Dh is constant regardless of the output level. For an acoustic piano, the larger the power level, the larger the amplitude of the string. Therefore, when the damper pedal is returning to the rest position from the end position, the larger the output level and the larger the amplitude of the string, the easier it is for the damper to come into contact with the string. By determining the damper setting range based on the output level, it is also possible to get closer to the playing feel of an acoustic piano.

Figure 17:
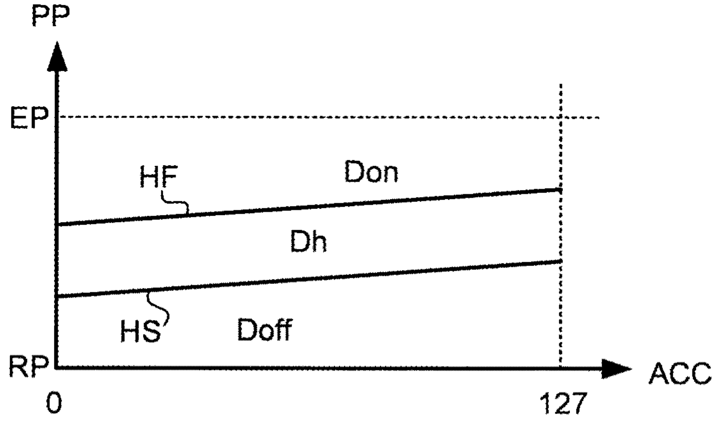
FIG. 17 is a diagram illustrating a relationship between a damper setting range and an acceleration defined in a decay control table according to a modification.

FIG. 17 is a diagram illustrating the relationship between the damper setting range and acceleration defined in the decay control table in the modification. As shown in FIG. 17, acceleration (ACC) is shown on the horizontal axis. In this example, the horizontal axis is defined in a range from the acceleration "0" (corresponding to the minimum acceleration of the key 70) to the acceleration "127" (corresponding to the maximum acceleration of the key 70). The operation position of the damper pedal 91 is shown on the vertical axis. In the example shown in FIG. 17, the larger the acceleration, the damper setting range is determined to be gradually close to the end position EP in both the boundary position HS and the boundary position HF. The difference between the boundary position HS and the boundary position HF, that is, the half-damper range Dh is constant regardless of the acceleration.

The decay control unit 131 may acquire the acceleration corresponding to the processing target sound and acquire the damper setting range corresponding to the acceleration in the processing of the step S103 shown in FIG. 7. In this case, the conversion unit 88 may generate acceleration of the key based on the information input from the key operation measurement unit 75 and provide the acceleration of the key to the decay control unit 131 as the key operation data. For to an acoustic piano, the larger the acceleration, the larger the amplitude of the string. Therefore, when the damper pedal is returning to the rest position from the end position, the larger the amplitude of the string by the key operation with high acceleration, the easier it is for the damper to come into contact with the string. By determining the damper setting range based on the acceleration, it is also possible to get closer to the playing feel of an acoustic piano.

(3) In the decay control table 135, the damper setting range corresponding to the note number in the predetermined range may not be determined. In a region where the damper setting range is not determined, the decay speed is not controlled, and the predetermined decay rate DR is set.

Figure 18:
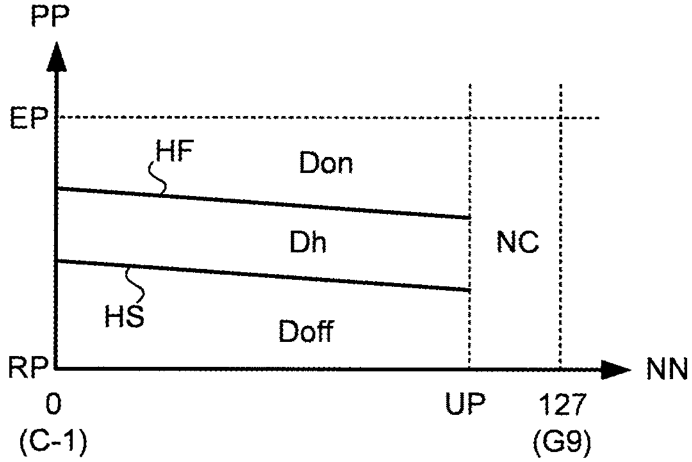
FIG. 18 is a diagram illustrating a relationship between a damper setting range and a note number defined in a decay control table according to a modification.

FIG. 18 is a diagram illustrating a relationship between the damper setting range and a note number defined in the decay control table in a modification. In the example shown in FIG. 18, in a range that is larger than an upper limit note number UP among the note number, the boundary position HS and the boundary position HF do not exist, and a non-control range NC is set as a non-target of the damper setting range. The decay control unit 131 does not subject the sound generated by the pitch in the non-control range NC to the decay control processing. In this way, it is also possible to reproduce the situation where the damper is not arranged, like the string of high sound in an acoustic piano.

(4) The damper setting range is not limited to the case where it is determined based on one piece of control information (for example, a note number), and may be determined based on a plurality of pieces of control information. For example, the damper setting range may be determined based on the note number and the velocity. In this case, the boundary position HS and the boundary position HF may be calculated by a predetermined arithmetic expression using the note number and the velocity as variables.

Figure 19:
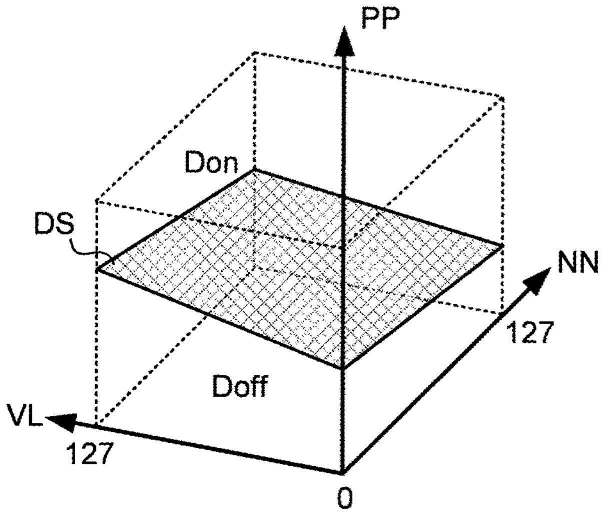
FIG. 19 is a diagram illustrating a relationship between a damper setting range and a plurality of control information (note number and velocity) defined in a decay control table according to a modification.

FIG. 19 is a diagram illustrating a relationship between the damper setting range and a plurality of control information (note number and velocity) defined in the decay control table in a modification. In the example shown in FIG. 19, for clarity, the damper setting range includes the damper-on range Don and the damper-off range Doff. The boundary position DS between the damper-on range Don and the damper-off range Doff is determined based on the note number and the velocity.

In the example shown in FIG. 19, the larger the note number and smaller the velocity, the boundary position DS is close to the rest position RP. That is, when the note number is minimum and the velocity is maximum, the boundary position DS is closest to the end position EP. The rate of change of the boundary position DS with respect to the velocity may be the same or different between the case where the note number is "0" and the case where the note number is "127". The range (upper limit and lower limit) of the boundary position DS may be determined in advance.

(5) At least one of the boundary position HS and the boundary position HF in the damper setting range may change nonlinearly with respect to changes in the control information such as a note number. For example, in the decay control table 135 shown in FIG. 6, the damper setting range may be defined so that changes of at least one of the boundary position HS and the boundary position HF are drawn in a curve.

(6) Not only the damper setting range may be changed according to the control information obtained by the operation to the key 70, but the decay speed may be further changed. For example, the decay coefficient K is set to "Kh" when the damper is a half-damper, but at this time, it may be set so that the value of "Kh" is further changed according to the control information such as a note number. Control of the decay speed may be realized by operation to the shift pedal 93. A specific processing method is exemplified in WO 2019/058457 disclosed as a prior art document.

(7) In the above-described embodiment, although the keyboard instrument 1 has been described as an example of an embodiment, it can also be implemented as the sound signal generation unit 800 included in the keyboard instrument 1, that is, a signal generation device, and it can also be implemented as the sound source unit 80 including the sound signal generation unit 800. In this case, the key operation data and the pedal operation data may be acquired from an input device having a keyboard and an input device having a damper pedal, or information for generating the key operation data and the pedal operation data may be acquired. The key operation data and the pedal operation data may be provided from an external device in format such as data in a predetermined standard (e.g., MIDI standard) or the like, or may be provided in the form of time-series recording on a recording medium.

(8) All or part of the functions of the sound source unit 80 may be realized by executing a control program by the CPU of the control unit 10. In this case, programs for causing the control unit 10 (computer) to execute the decay control processing may be provided by downloading via a recording medium or network. In addition, the program may be downloaded to a personal computer or the like and executed, whereby the computer may be used as a signal generation device.

(9) In the keyboard instrument 1 in the above-described embodiment, although the housing 50 and the pedal device 90 are configured to be detachable from each other, they may not be detachable accommodated in an integral housing.

(10) The decay speed of the sound may be corrected according to the operation position of the shift pedal 93.

(11) Although the decay speed of the sound is controlled by changing the envelope waveform in the above-described embodiment, it may be controlled by controlling the degree to which reverberation is added.

According to an embodiment of the present disclosure, there is provided a signal generation device including a memory configured to store instructions and a processor communicatively connected to the memory and configured to execute the stored instructions to function as a signal generation unit configured to generate a sound signal based on key operation data associated with a key operation, and a decay control unit configured to control a decay speed of the sound signal based on pedal operation data associated with a pedal operation position, wherein the decay control unit is further configured to control the decay speed to a first speed in a case where the pedal operation position is in a first range in a changeable range of the pedal operation position, wherein the decay control unit is further configured to control the decay speed to a second speed greater than the first speed in a case where the pedal operation position is in a second range adjacent to the first range, and wherein a first boundary position between the first range and the second range is determined based on control information obtained by the key operation. The signal generation device can be further configured as follows.

The decay control unit is further configured to control the decay speed to a third speed different from the first speed and the second speed in a case where the pedal operation position is in a third range different from the first range and the second range.

The third range is adjacent to one of the first and second ranges. A second boundary position between the third range and one of the first range and the second range is determined based on the control information.

The third range is adjacent to the second range. A second boundary position between the second range and the third range is determined based on the control information.

A difference between the first boundary position and the second boundary position depends on the control information.

The control information includes pitch information corresponding to the key. The first boundary position indicates a first position in a case where the pitch information indicates a first pitch. The first boundary position indicates a second position closer to the rest position than the first position in a case where the pitch information indicates a second pitch higher than the first pitch.

The control information includes speed information of the key. The first boundary position indicates a third position in a case where the speed information indicates a first speed. The first boundary position indicates a fourth position closer to a rest position than the third position in a case where the speed information indicates a second speed which is smaller than the first speed.

The control information includes output level information of the sound signal generated by the key operation. The first boundary position indicates a fifth position in a case where the output level information indicates a first output level. The first boundary position indicates a sixth position closer to a rest position than the fifth position in a case where the output level information indicates a second output level smaller than the first output level.

The first boundary position between the first range and the second range is determined based on control information obtained from the key operation corresponding to the sound signal for which the decay speed is controlled.

According to another embodiment of the present disclosure, there is provided a signal generation method including generating a sound signal based on key operation data associated with a key operation, and controlling a decay speed of the sound signal based on pedal operation data associated with a pedal operation position, wherein controlling the decay speed of the sound signal includes determining a first boundary position between a first range in a changeable range of the pedal operation position and a second range adjacent to the first range based on control information obtained by the key operation, and controlling the decay speed to a first speed in a case where the pedal operation position is in the first range, and to a second speed greater than the first speed in a case where the pedal operation position is in the second range. The signal generation method can be further configured as follows.

Controlling the decay speed of the sound signal further includes controlling the decay speed to a third speed different from the first speed and the second speed in a case where the pedal operation position is in a third range different from the first range and the second range.

The third range is adjacent to one of the first range and the second range. Controlling the decay speed of the sound signal further includes determining a second boundary position between the third range and one of the first range and the second range based on the control information.

The third range is adjacent to the second range. Controlling the decay speed of the sound signal further includes determining a second boundary position between the second range and the third range based on the control information.

A difference between the first boundary position and the second boundary position depends on the control information.

The control information includes pitch information corresponding to the key. The first boundary position indicates a first position in a case where the pitch information indicates a first pitch. The first boundary position indicates a second position closer to a rest position than the first position in a case where the pitch information indicates a second pitch higher than the first pitch.

The control information includes speed information of the key. The first boundary position indicates a third position in a case where the speed information indicates a first speed. The first boundary position indicates a fourth position closer to a rest position than the third position in a case where the speed information indicates a second speed which is smaller than the first speed.

The control information includes output level information of the sound signal generated by the key operation. The first boundary position indicates a fifth position in a case where the output level information indicates a first output level. The first boundary position indicates a sixth position closer to a rest position than the fifth position in a case where the output level information indicates a second output level smaller than the first output level.

The first boundary position between the first range and the second range is determined based on control information obtained from the key operation corresponding to the sound signal for which the decay speed is controlled.

According to another embodiment of the present disclosure, there is provided a computer-readable storage medium having stored thereon a program for causing a computer to execute operations including generating a sound signal based on key operation data associated with a key operation, and controlling a decay speed of the sound signal based on pedal operation data associated with a pedal operation position, wherein controlling the decay speed of the sound signal includes determining a first boundary position between a first range in a changeable range of the pedal operation position and a second range adjacent to the first range based on control information obtained by the key operation, and controlling the decay speed to a first speed in a case where the pedal operation position is in the first range, and to a second speed greater than the first speed in a case where the pedal operation position is in the second range.

What is claimed is:

1. A signal generation device comprising:

a memory configured to store instructions; and a processor communicatively connected to the memory and configured to execute the stored instructions to function as:

a signal generation unit configured to generate a sound signal based on key operation data associated with operation of a key; and a decay control unit configured to control a decay speed of the sound signal based on pedal operation data associated with a pedal operation position, wherein the decay control unit is further configured to control the decay speed to a first speed in a case where the pedal operation position is in a first range in a changeable range of the pedal operation position, wherein the decay control unit is further configured to control the decay speed to a second speed greater than the first speed in a case where the pedal operation position is in a second range adjacent to the first range, and wherein a first boundary position indicating a first boundary between the first range and the second range of the pedal operation position is determined based on control information obtained by the operation of the key.

2. The signal generation device according to claim 1, wherein the decay control unit is further configured to control the decay speed to a third speed different from the first speed and the second speed in a case where the pedal operation position is in a third range different from the first range and the second range.

3. The signal generation device according to claim 2, wherein the third range is adjacent to one of the first range and the second range, and wherein a second boundary position indicating a second boundary between the third range and one of the first range and the second range of the pedal operation position is determined based on the control information.

4. The signal generation device according to claim 2, wherein the third range is adjacent to the second range, and wherein a second boundary position indicating a second boundary between the second range and the third range of the pedal operation position is determined based on the control information.

5. The signal generation device according to claim 4, wherein a difference between the first boundary position and the second boundary position depends on the control information.

6. The signal generation device according to claim 1, wherein the control information includes pitch information corresponding to the key, and wherein the first boundary position indicates a first position of the pedal operation position in a case where the pitch information indicates a first pitch, and a second position of the pedal operation position closer to a rest position of the pedal operation position than the first position in a case where the pitch information indicates a second pitch higher than the first pitch.

7. The signal generation device according to claim 1, wherein the control information includes speed information of the key, and wherein the first boundary position indicates a first position of the pedal operation position in a case where the speed information indicates a first speed, and a fourth second position of the pedal operation position closer to a rest position of the pedal operation position than the first position in a case where the speed information indicates a second speed which is smaller than the first speed.

8. The signal generation device according to claim 1, wherein the control information includes output level information of the sound signal generated by the operation of the key, and wherein the first boundary position indicates a first position of the pedal operation position in a case where the output level information indicates a first output level, and a second position of the pedal operation position closer to a rest position of the pedal operation position than the first position in a case where the output level information indicates a second output level smaller than the first output level.

9. The signal generation device according to claim 1, wherein the first boundary position between the first range and the second range is determined based on the control information obtained from the operation of the key corresponding to the sound signal for which the decay speed is controlled.

10. A signal generation method comprising:

generating a sound signal, via a signal generation device, based on key operation data associated with operation of a key; and controlling a decay speed of the sound signal based on pedal operation data associated with a pedal operation position, wherein controlling the decay speed of the sound signal includes:

determining a first boundary position indicating a first boundary between a first range in a changeable range of the pedal operation position and a second range adjacent to the first range based on control information obtained by the operation of the key; and controlling the decay speed to a first speed in a case where the pedal operation position is in the first range, and to a second speed greater than the first speed in a case where the pedal operation position is in the second range.

11. The signal generation method according to claim 10, wherein controlling the decay speed of the sound signal further includes controlling the decay speed to a third speed different from the first speed and the second speed in a case where the pedal operation position is in a third range different from the first range and the second range.

12. The signal generation method according to claim 11, wherein the third range is adjacent to one of the first range and the second range, and wherein controlling the decay speed of the sound signal further includes determining a second boundary position indicating a second boundary between the third range and one of the first range and the second range of the pedal operation position based on the control information.

13. The signal generation method according to claim 11, wherein the third range is adjacent to the second range, and wherein controlling the decay speed of the sound signal further includes determining a second boundary position indicating a second boundary between the second range and the third range of the pedal operation position based on the control information.

14. The signal generation method according to claim 13, wherein a difference between the first boundary position and the second boundary position depends on the control information.

15. The signal generation method according to claim 10, wherein the control information includes pitch information corresponding to the key, and wherein the first boundary position indicates a first position of the pedal operation position in a case where the pitch information indicates a first pitch, and a second position of the pedal operation position closer to a rest position of the pedal operation position than the first position in a case where the pitch information indicates a second pitch higher than the first pitch.

16. The signal generation method according to claim 10, wherein the control information includes speed information of the key, and wherein the first boundary position indicates a first position of the pedal operation position in a case where the speed information indicates a first speed, and a fourth-second position of the pedal operation position closer to a rest position of the pedal operation position than the first position in a case where the speed information indicates a second speed which is smaller than the first speed.

17. The signal generation method according to claim 10, wherein the control information includes output level information of the sound signal generated by the operation of the key, and wherein the first boundary position indicates a first position of the pedal operation position in a case where the output level information indicates a first output level, and a sixth-second position of the pedal operation position closer to a rest position of the pedal operation position than the first position in a case where the output level information indicates a second output level smaller than the first output level.

18. The signal generation method according to claim 10, wherein the first boundary position between the first range and the second range is determined based on control information obtained from the operation of the key corresponding to the sound signal for which the decay speed is controlled.

19. A non-transitory computer-readable storage medium having stored thereon a program for causing a computer to execute operations comprising:

generating a sound signal, via a signal generation device, based on key operation data associated with operation of a key; and controlling a decay speed of the sound signal based on pedal operation data associated with a pedal operation position, wherein controlling the decay speed of the sound signal includes:

determining a first boundary position indicating a first boundary between a first range in a changeable range of the pedal operation position and a second range adjacent to the first range based on control information obtained by the operation of the key; and controlling the decay speed to a first speed in a case where the pedal operation position is in the first range, and to a second speed greater than the first speed in a case where the pedal operation position is in the second range.

* * * * *